United States Patent
Ascari et al.

(10) Patent No.: US 8,512,786 B2
(45) Date of Patent: Aug. 20, 2013

(54) METHOD AND MACHINE FOR STONING MANGO FRUIT

(75) Inventors: Daniela Ascari, Cavezzo (IT); Luca Ascari, Cavezzo (IT)

(73) Assignee: A.B.L. S.R.L., Cavezzo (IT)

( * ) Notice: Subject to any disclaimer, the term of this patent is extended or adjusted under 35 U.S.C. 154(b) by 0 days.

(21) Appl. No.: 13/639,417

(22) PCT Filed: Feb. 23, 2011

(86) PCT No.: PCT/IB2011/050739
§ 371 (c)(1),
(2), (4) Date: Oct. 4, 2012

(87) PCT Pub. No.: WO2011/132090
PCT Pub. Date: Oct. 27, 2011

(65) Prior Publication Data
US 2013/0029023 A1    Jan. 31, 2013

(30) Foreign Application Priority Data
Apr. 23, 2010 (IT) .............................. MO2010A0126

(51) Int. Cl.
*A23N 4/04* (2006.01)
(52) U.S. Cl.
USPC .................. 426/485; 99/564; 99/553; 99/557
(58) Field of Classification Search
USPC ............................. 426/485; 99/564, 553, 557
See application file for complete search history.

(56) References Cited

U.S. PATENT DOCUMENTS

| | | | | |
|---|---|---|---|---|
| 2,032,737 A * | 3/1936 | Bush et al. | ...................... | 99/562 |
| 2,474,492 A * | 6/1949 | Perrelli et al. | .................. | 99/555 |
| 2,664,127 A * | 12/1953 | Perrelli | ........................... | 99/551 |
| 2,967,554 A * | 1/1961 | Waters | .......................... | 99/551 |
| 3,465,799 A * | 9/1969 | Giordano | ....................... | 99/553 |
| 3,633,641 A * | 1/1972 | Tomelleri | ....................... | 99/557 |
| 5,250,311 A | 10/1993 | Ross et al. | | |
| 6,214,398 B1 * | 4/2001 | Veltman et al. | ............... | 426/485 |
| 6,220,153 B1 | 4/2001 | Easby | | |
| 2005/0257696 A1 * | 11/2005 | Walzak et al. | .................. | 99/538 |

FOREIGN PATENT DOCUMENTS

| FR | 2 909 915 A1 | 6/2008 |
|---|---|---|
| WO | 88/07333 A1 | 10/1988 |

* cited by examiner

*Primary Examiner* — Anthony Weier
(74) *Attorney, Agent, or Firm* — Pearne & Gordon LLP

(57) ABSTRACT

The present invention relates to a method and a machine for stoning mangoes. The method includes a stage of blocking the mango fruit frontally of a cutting blade (3), which performs a first cut below the stone and a second cut above the stone; the cuts, performed with the same or with different blades, intersects a whole length in a longitudinal direction of the fruit and are performed by thrust-insertion of a cutting blade in the longitudinal direction of the stone. The machine for implementing the method includes one or more work stations (6, 7, 8, 9), each of which includes at least a blocking group (10) which blocks the fruit in a desired position thereof; at least a station includes a blade (3) with a shaped cutting profile which is provided with straight motion and performs the cuts envisaged by the method; sliding means (11) are provided to cause the straight motion of the blade.

9 Claims, 2 Drawing Sheets

METHOD AND MACHINE FOR STONING MANGO FRUIT

The present invention relates to a method and machine for stoning mango fruit.

The mango tree produces large fruit of an irregular, substantially oval shape, which possesses a rather tenacious, compact pulp; inside the fruit there is a large stone of an elongated shape with an approximately constant oval cross-section over its entire length.

The stone must be removed from the fruit in order for it to be used. This operation is not very easy, particularly on an industrial scale, given the consistency of the fruit's pulp; it is not in fact convenient to use "coring" systems, such as those used, for example, to remove the hard inner part of pineapples, because the tubular blade would penetrate into the fruit with difficulty and would be freed from the stone inside it with equal difficulty.

At present, machines are used which make two parallel cuts on the fruit, with the stone lying between them; with this system a large part, about 30%, of the fruit pulp is wasted, namely, the part of the pulp that is situated at the sides of the stone along the longitudinal direction thereof.

The object of the present invention is to provide a method, and a machine that implements said method, which enables the stone to be removed from the mango without posing problems of deterioration of the fruit or of evacuation of the removed stone, and which result in a minimal waste of the mango pulp itself.

An advantage of the invention is that of providing a machine that is simple to construct and use.

These objects and advantages and other additional ones are all achieved by the present invention, as characterised by the claims appended below.

Figure 1:
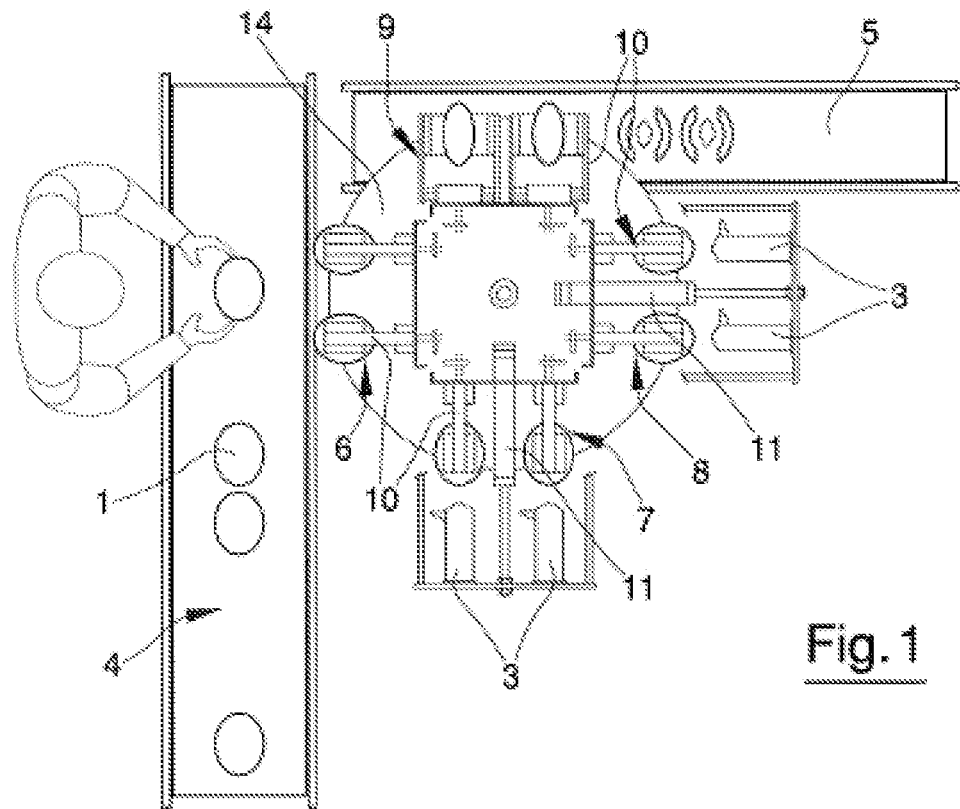
Figure 2:
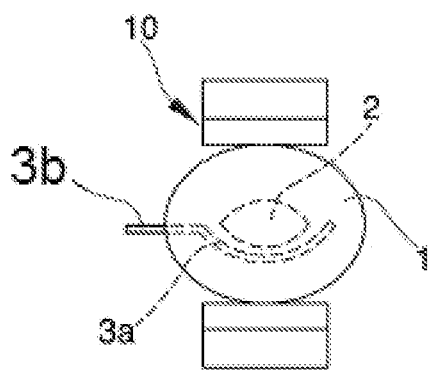
Figure 3:
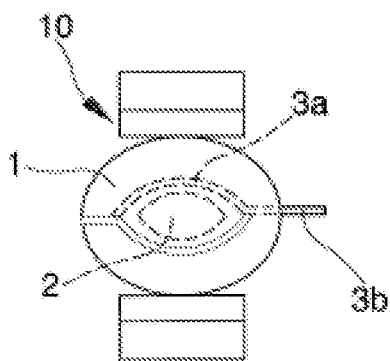
Figure 4:
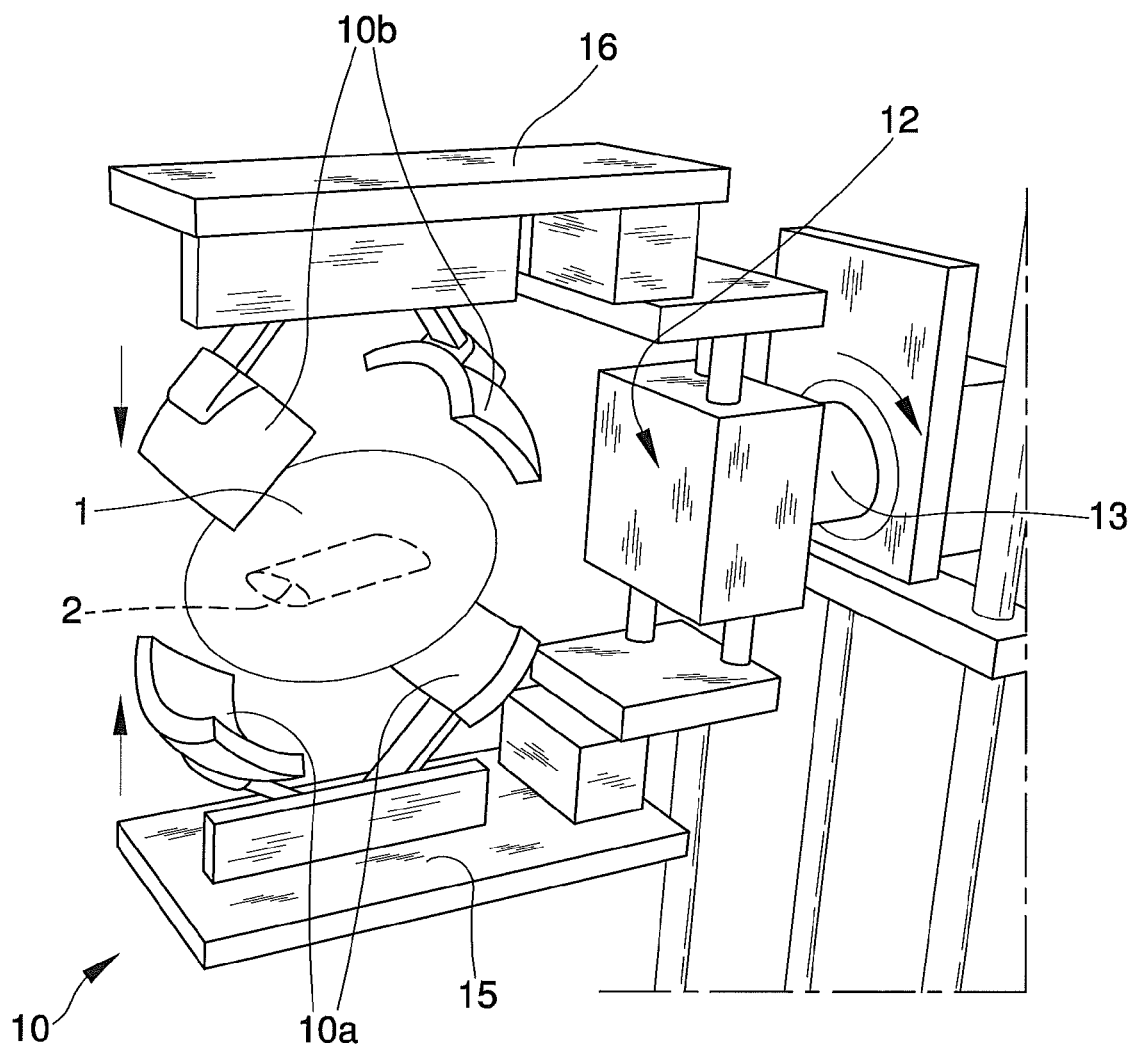

Further characteristics and advantages of the present invention will become more apparent from the following detailed description of the various stages of the method concerned and of a possible embodiment of the machine concerned, illustrated by way of non-restrictive example in the appended figures in which:

FIG. 1 shows a schematic view from above of a possible embodiment of the machine concerned;

FIG. 2 schematically shows a mango blocked by the blocking means, with a broken line representing the cross-section of a blade that performs the first cut;

FIG. 3 schematically shows a mango blocked by the blocking means, with the first cut already made and a broken line representing the cross-section of a blade that performs the second cut;

FIG. 4 shows a schematic perspective view of a possible embodiment of the blocking means in the upper position, with the mango inserted, but not blocked, between the jaws.

The method of the invention involves first of all a stage of supplying single mangoes 1, which are acted upon singly, this stage being carried out by means of conventional mechanical or manual systems. There follows a stage of blocking the mango, which is blocked in a position before a cutting blade 3, which acts upon the fruit by frontal insertion of the blade into the fruit itself. The mangoes submitted to the method can be whole or peeled beforehand.

Then a first cut is performed by introducing the blade into the fruit in a longitudinal direction of the stone 2; the profile of the first cut (hence of the blade cutting edge) extends for a semi-perimeter of the section of the mango stone, interests the median part of the fruit located on one side of the stone, and interests a whole length of the fruit in a longitudinal direction. Once the first cut has been performed, the blade is extracted from the fruit.

Then a second cut is performed, again by introducing the blade into the fruit in a longitudinal direction of the stone; the profile of the second cut, obtained with a blade having the same profile as the one used to perform the first cut, but in reverse, extends for a semi-perimeter of the section of the stone opposite the semi-perimeter of the first cut and interests the median part of the fruit arranged on the side of the stone which is opposite the side of the first cut; the second cut also interests a whole length in a longitudinal direction of the mango and intersects the first cut in proximity to the mango stone in such a way that once the two cuts have been performed, the mango displays a continuous cutting line that divides the fruit into two parts and separates the pulp from the mango stone. Once the second cut has been performed, the blade is extracted from the fruit.

The first and second cuts can be performed in two work stations, arranged one after another, into which each single mango being worked is successively transported; in such a case the blades in the first and second stations will be arranged on opposite sides relative to the centreline of the fruit, so that the first cut will be performed in the lower part to the left of the mango stone and the second one in the upper part to the right of the mango stone.

The first and second cuts can also be performed in a single work station by means of a stage of reciprocal movement between the mango being worked and the cutting blade, which enables a relative rotation of 180° between the fruit and the cutting blade about a median axis of the mango stone; in particular, it is the mango which is rotated by 180° so that first the lower part to the left of the mango stone will be placed before the cutting edge of the blade and then the upper part to the right of the mango stone.

Once the two cuts have been performed, there is envisaged a stage of unloading the stones and the stoned mangoes, which is achieved simply by freeing the cut fruit from the blocking means. In order to facilitate the unloading stage, it is preferable that the first cut be performed in the lower zone of the semi-perimeter of the stone. If done in this manner, after the first cut the stone will still be connected to the mango pulp and will therefore not remain on the blade that is extracted from the fruit; after the second cut the stone will be free but the blade will be positioned above the stone, which will thus remain inside the fruit upon extraction of the blade.

The machine for implementing the above-described procedure comprises a system for supplying the single mangoes 1, which can be whole or peeled beforehand; in the figures, which show a possible embodiment of said machine, the supply system is represented by a conveyor belt 4 which transports the fruit to an operator, who collects it and positions it on the machine.

The machine of the invention comprises one or more work stations in which the mango fruits are singly subjected to work operations; in the machine illustrated there are present four work stations 6, 7, 8, 9, in each of which the stages of the procedure are carried out in succession as will be better explained below; it is however possible to construct machines with a single work station in which all stages of the procedure are carried out in succession.

Each work station comprises at least one blocking group 10 suitable for receiving and blocking the mango in a desired position thereof; in the machine illustrated, two of said blocking groups are present in every work station and the operator may introduce a mango into each of them.

Each blocking group comprises two lower jaws 10a and two upper jaws 10b, which can near and distance reciprocally such as to block and free the mango arranged there-between; in particular, the blocking group comprises two opposite support elements 15 and 16, each of which supports a pair of jaws, respectively a lower jaw and an upper jaw.

There are provided first motor means 12 which on command cause nearing and distancing of the jaws so as to block or free the fruit; these first motor means comprise an operating cylinder which is operatively located between the two support elements and enables reciprocal nearing and distancing of the two support elements.

There are also provided second motor means 13 which on command set the blocking group in rotation about an axis which is parallel to the longitudinal direction of development of the support elements or, as explained below, parallel to the longitudinal direction of development of the mango stone 2 blocked in the blocking group. For this purpose the blocking group is supported by a shaft, which is substantially parallel to the development direction of the support elements and is set in rotation on command by the second motor means, of a known kind, so as to cause the rotation of the blocking group.

In at least one work station of the machine there is provided a blade 3, which has a shaped cutting profile and is provided with straight motion obtained via suitable sliding means; the mango blocked by the blocking group is brought, by suitable movement means, before the blade in a position in which the mango stone 2 is in line with the blade, but outside the trajectory of a cutting profile of the blade and with the stone arranged with a longitudinal dimension thereof parallel to the motion direction of the blade.

The fruit is placed in the blocking group so that the length of the stone is in the sliding direction of the blade and the jaws of the blocking group are conformed in such a way as to prevent movement of the fruit in a longitudinal direction of development of the stone and to leave free, along a direction parallel to the longitudinal direction of the stone, the median zone and the zone corresponding to the stone of the fruit.

The blade of the machine is substantially constructed with a metal profiled section that has a front cutting profile; the cutting profile of the blade is shaped in such a way as to surround a semi-perimeter of a section of the mango stone and to interest a median part of the mango arranged on a side of the stone; in particular, the cutting profile of the blade comprises a curved part 3a, shaped such as to be a half of the section of the mango stone, to which curved part a linear part 3b is connected having a greater length than a distance between an outside of the stone and an outside of the fruit measured in the cutting direction.

With the fruit correctly positioned relative to the blade, the first and the second cut are performed on the fruit as envisaged in the above-described procedure, in succession and with methods defined by the configuration of the machine.

In a possible configuration of the machine illustrated in the figures, there is envisaged a turntable 14 which is provided with four work stations, each provided with two blocking groups; the work stations are arranged in a quadrilateral and are reached in sequence by the various blocking groups following controlled rotations of the platform.

In the first station 6 the mangoes are singly loaded and blocked in the blocking group with the stone arranged with a longitudinal dimension thereof in a diameter direction of the platform.

In the second station 7 two blades are provided, one for each blocking group, and these are provided with linear motion substantially in the diameter direction of the platform, or one that is in any case parallel to the mango stone, which is positioned before the blade in order for the first cut to be made.

In the third station 8 two blades are provided, one for each blocking group, likewise provided with linear motion substantially in a diameter direction of the platform or one that is in any case parallel to the mango stone, which is positioned before the blade in order for the second cut to be made; the blades of the second and third station are obviously arranged on opposite sides of the mango centreline (they are reversed in relation to one another) so that the first cut will be performed in the lower part to the left of the mango stone and the second one in the upper part to the right of the mango stone.

The fourth station 9 is located in proximity to an evacuation system for the stones and stoned mangoes, represented in the figure as a normal conveyor belt 5; in this station the blocking groups are rotated by about 90°, each about an axis parallel to the diameter direction, and the respective jaws are opened in order to deposit the stone and the stoned mango on the evacuation system.

The movement means which enable the mango fruit blocked by the blocking means to be brought before the blade in a position in which the mango stone is in line with the blade comprise an operating cylinder (not illustrated) which, on command, brings said blocking group from an upper position into a lower position with a movement in a vertical direction; the blade is naturally in a position corresponding to the lower position of the blocking group. In the machine illustrated the movement means also comprise means to cause the rotation of the turntable and bring the mango from the second to the third station.

The sliding means of the blade comprise an operating cylinder 11 which, on command, causes the blade to slide from an external position, in which it is external to the blocking group (i.e. the mango), to an internal position, in which the blade is inserted in the mango blocked by the blocking group.

The machine described enables good productivity. The above-described method can be in any case implemented with simpler machines, albeit with a lower productivity. It is possible to envisage, for example, a machine with a single work station in which the various stages of the procedure are carried out in sequence. In a machine of this type, the mango is loaded onto the blocking group, which is subsequently translated (lowered) in front of the blade so that the first cut may be made. Once the blade has been extracted, the blocking group is made to rotate by 180° and the blade is once again introduced into the fruit to perform the second cut. After the blade had been extracted from the fruit, the blocking group is then rotated by about 90° about an axis parallel to the diameter direction, and the respective jaws are opened so as to deposit the stone and the stoned mango on the evacuation system, which in said machine will be placed, like the system for supplying the mangoes, in proximity to the single work station.

The invention claimed is:

1. A method for stoning mango fruit, comprising a stage of supplying single mangoes (1), and a stage of unloading stones (2) and stoned mangoes (1a), characterised in that it comprises following stages: blocking the mango frontally of a cutting blade (3); performing a first cut, in a longitudinal direction of the stone, which extends for a semi-perimeter of a section of the stone and interests a median part of the mango located on a side of the stone, the first cut interesting a whole length in a longitudinal direction of the mango; performing a second cut, in a longitudinal direction of the stone, which extends for a semi-perimeter of the section of the stone opposite the semi-perimeter of the first cut and interests a median part of the mango arranged on a side of the stone which is opposite the side of the first cut, the second cut interesting a the whole length in a longitudinal direction of the mango and intersecting the first cut in proximity of the mango stone; the first cut and the second cut being performed by thrust-insertion of a cutting blade in the longitudinal direction of the stone.

2. The method of claim 1, characterised in that the first cut and the second cut are performed in two work stations, arranged one after another, into which each single mango being worked is successively transported.

3. The method of claim 1, characterised in that it comprises a stage of reciprocal movement between the mango being worked and the cutting blade which enables a relative rotation of 180° between the mango and the cutting blade, about a median axis of the stone; the rotation taking place between the stage of performing the first cut and the stage of performing the second cut.

4. The method of claim 1, characterised in that the first cut interests a lower zone of the semi-perimeter of the stone.

5. A machine for stoning mango fruit, comprising a supply system (4) of single mangoes (1), an evacuation system (5) of stones (2) and stoned mangoes (1a), and one or more work stations (6, 7, 8, 9) in which the mangoes are single subjected to work operations, characterised in that: each work station comprises at least a blocking group (10) destined to receive and block the mango in a desired position thereof; at least a work station comprises at least a blade (3), having a shaped cutting profile and being provided with straight motion, before which the mango is brought, blocked by the blocking group in a position in which the stone is in line with the blade, but outside a trajectory of a cutting profile of the blade, with the stone arranged with a longitudinal dimension thereof parallel to the motion direction of the blade; the cutting profile of the blade being shaped such as to surround a semiperimeter of a section of the mango stone and to interest a median part of the mango arranged on a side of the stone; there being provided movement means for positioning the mango with respect to a blade such that the blade performs, in succession, a first cut on a semi-perimeter and on a side of the stone and a second cut on the semi-perimeter and on an opposite side to the first cut; there further being provided sliding means (11) for causing the straight motion of the blade.

6. The machine of claim 5, characterised in that the cutting profile of the blade comprises a curved part (3a), shaped such as to be a half of the section of the mango stone, to which curved part a linear part (3b) is connected having a greater length than a distance between an outside of the stone and an outside of the fruit measured in the cutting direction.

7. The machine of claim 5, characterised in that the blocking group (10) comprises two lower jaws (10a) and two upper jaws (10b) which can near and distance reciprocally such as to block and free the mango arranged there-between; the jaws being conformed such as to prevent movement of the fruit in a longitudinal direction of development of the stone and to leave free, along a parallel direction to the direction, the median zone and the zone corresponding to the stone of the fruit in order for the blade to be introduced; first motor means (12) are included to cause nearing and distancing of the jaws; also included are second motor means (13) destined to cause rotation of the blocking group about an axis which is parallel to the longitudinal direction of development of the stone.

8. The machine of claim 7, characterised in that it comprises: a turntable (14) provided with four work stations (6, 7, 8, 9), each provided with at least a blocking group (10) arranged in a quadrilateral and reached in sequence by the various blocking groups following rotations of the platform; in the first station (6) the mangoes are singly loaded and blocked in the blocking group with the stone arranged with a longitudinal dimension thereof in a diameter direction of the platform; the second station (7) comprises at least a blade (3), provided with linear motion in the diameter direction of the platform, before which the mango is positioned in order for the first cut to be made; the third station (8) comprises at least a blade (3), provided with linear motion in the diameter direction of the platform, before which the mango is positioned in order to perform the second cut; in the fourth station (9), arranged in proximity of the evacuation system (5) of the stones and the stoned mangoes, the blocking group is rotated about a parallel axis to the diameter direction, and the jaws are opened in order to deposit the stone and the stoned mange on the evacuation system.

9. The machine of claim 7, characterised in that: the blocking group comprises two opposite support elements (15, 16), each of which supports a pair of jaws, respectively a lower jaw and an upper jaw; the first motor means comprise at least an operating cylinder which enables nearing and distancing of the two support elements; the blocking group is supported by a shaft, substantially parallel to the development direction of the support elements, set in rotation on command by the second motor means; the movement means comprise an operating cylinder which, on command, brings the blocking group from an upper position to a lower position; the blade is arranged at the lower position of the blocking group; the sliding means comprise an operating cylinder (11) which, on command, causes the blade to slide from an external position, in which it is external of the blocking group, to an internal position, in which the blade is inserted in the mango blocked by the blocking group.

* * * * *